A. T. EMERY.
APPARATUS FOR MANUFACTURING CARBON PAPER.
APPLICATION FILED MAR. 20, 1911.
1,196,091.
Patented Aug. 29, 1916.
4 SHEETS—SHEET 1.
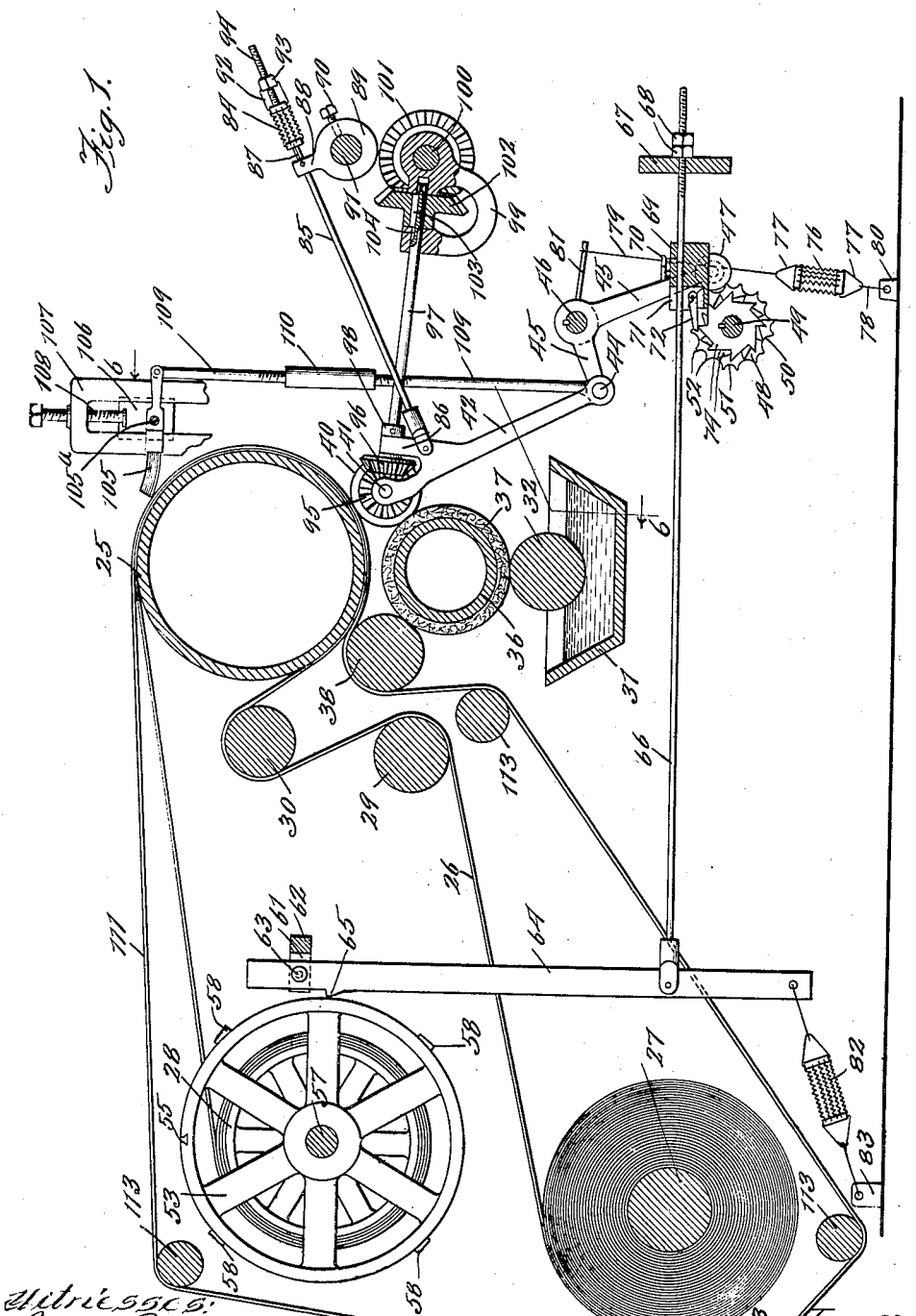

A. T. EMERY.
APPARATUS FOR MANUFACTURING CARBON PAPER.
APPLICATION FILED MAR. 20, 1911.
1,196,091.
Patented Aug. 29, 1916.
4 SHEETS—SHEET 2.
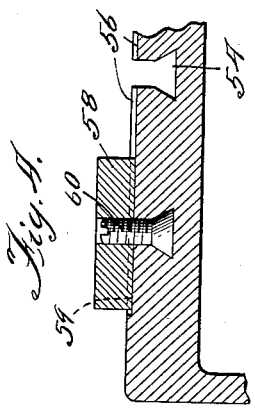
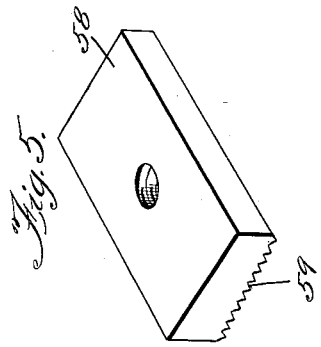
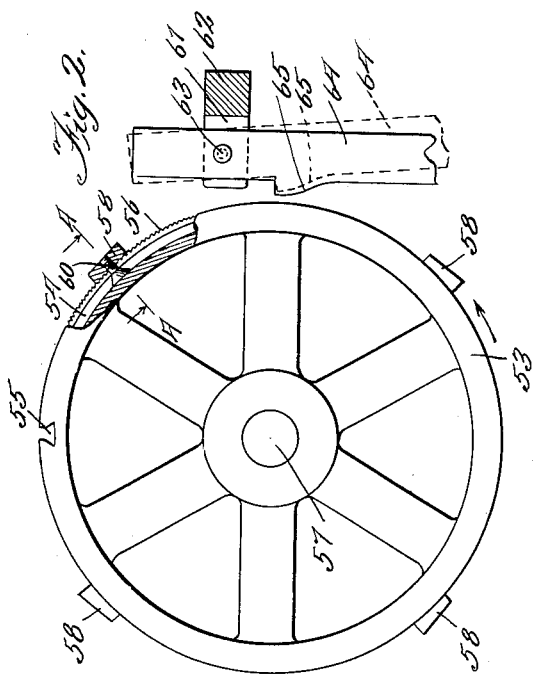
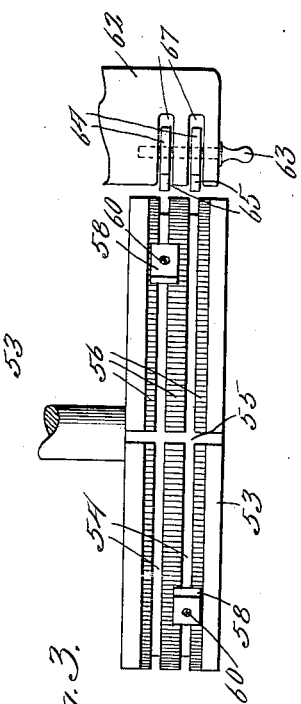

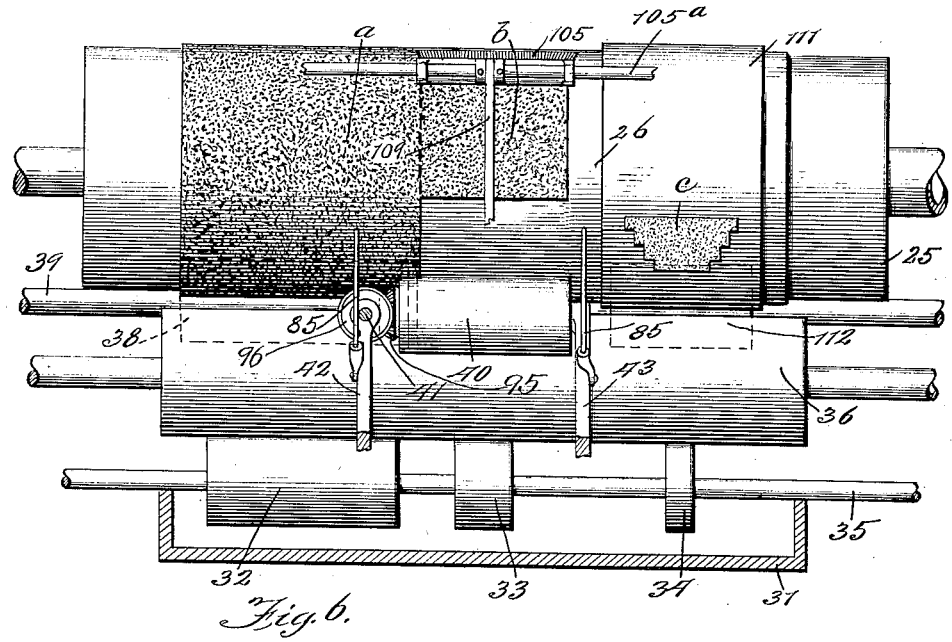
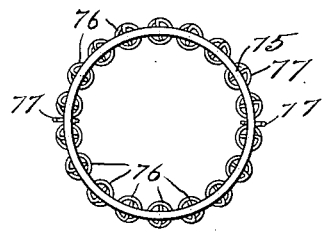
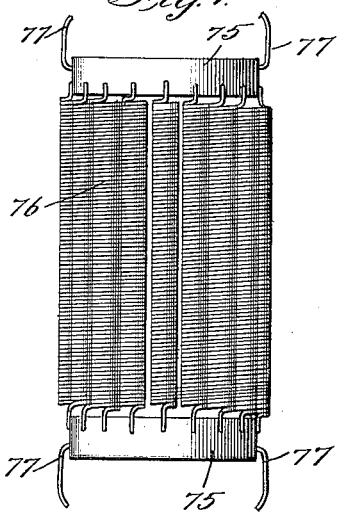

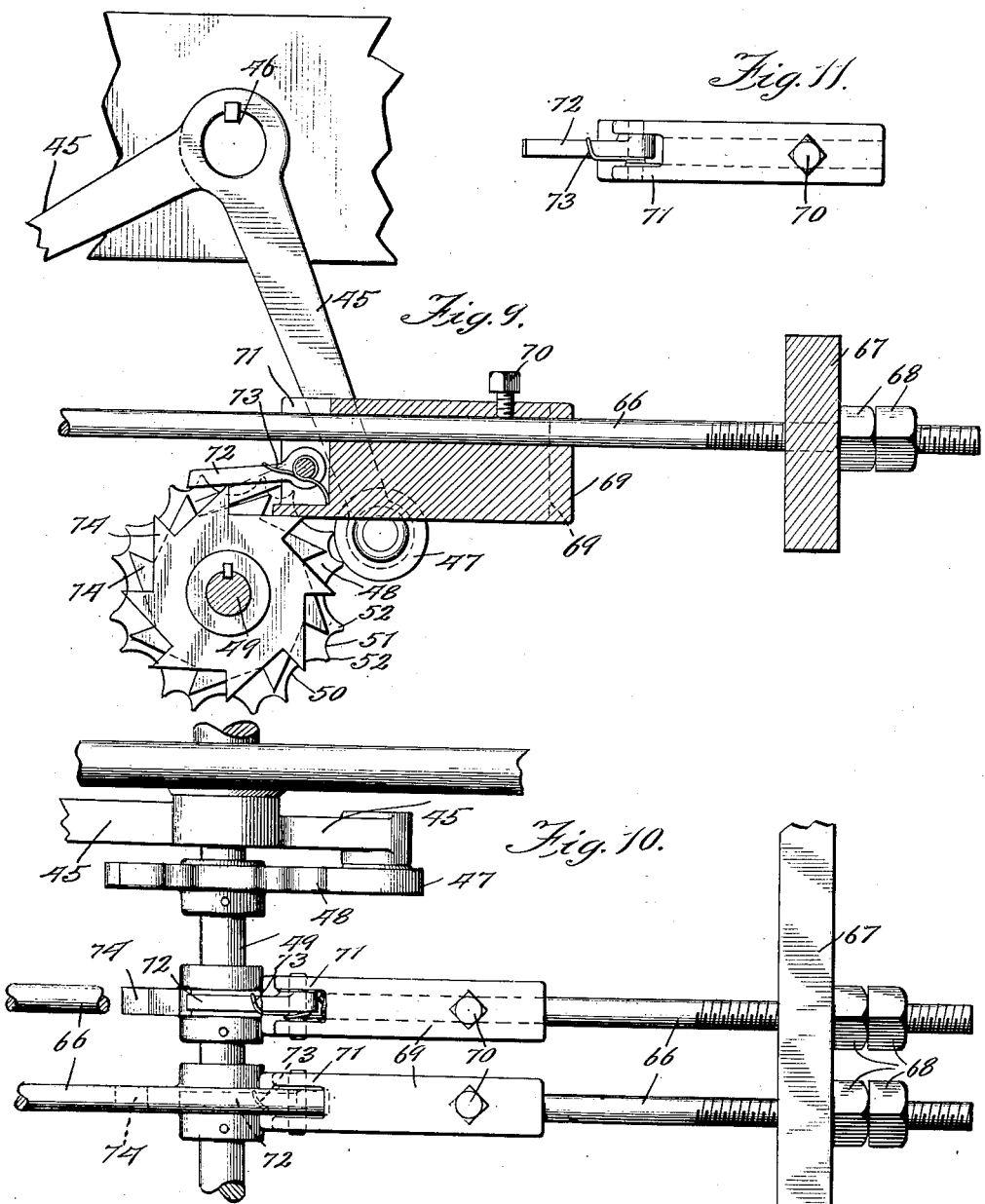

UNITED STATES PATENT OFFICE.

ARTHUR T. EMERY, OF AURORA, ILLINOIS.

APPARATUS FOR MANUFACTURING CARBON-PAPER.

1,196,091. Specification of Letters Patent. Patented Aug. 29, 1916.

Application filed March 20, 1911. Serial No. 615,551.

*To all whom it may concern:*

Be it known that I, ARTHUR T. EMERY, a citizen of the United States, residing at Aurora, in the county of Kane and State of Illinois, have invented certain new and useful Improvements in Apparatus for Manufacturing Carbon-Paper, of which the following is a specification.

My invention relates to an apparatus for manufacturing carbon paper or like products, and the invention has for its primary object to provide certain novel and improved constructions, arrangements and devices in apparatus of this character whereby the paper or other web or sheet of fabric operated upon may be carbonized or coated at certain places only, or the carbonization or coating interrupted at intervals or given particular configurations as may be desired.

The invention has for further objects the several novel and improved constructions, arrangements and devices in carbonizing or coating apparatus which will be hereinafter described and claimed.

The invention is illustrated, in a preferred embodiment, in the accompanying drawings, wherein—

Figure 1 is a sectional elevation taken longitudinally of the apparatus; Fig. 2, a detail view in elevation, with parts in section, of the wheel governing the movements of the coating roller; Fig. 3, a plan view of the parts shown in Fig. 2; Fig. 4, a section taken on line 4—4 of Fig. 2, looking in the direction of the arrows; Fig. 5, a view, in perspective, of one of the wedge blocks shown in the preceding three figures; Fig. 6, a sectional elevation taken on line 6—6 of Fig. 1, looking in the direction of the arrows; Figs. 7 and 8, an end view and side view, respectively, of one of the compound springs employed in the mechanism for moving the coating roller; Figs. 9 and 10, a sectional elevation and a plan view, respectively, of the cam wheel and ratchet and pawl mechanism forming a part of the means for moving the coating roller, and Fig. 11, a detail plan view of the pawl shown in the preceding two figures.

Like characters of reference indicate like parts in the several figures of the drawings.

Referring to the drawings, 25 designates a roller over which the paper web 26 to be carbonized is run, the latter being taken, in the particular form of machine shown, from a roll 27 and, when carbonized, being received on a drum 28. The roller 25 is preferably hollow and kept filled with steam. The web 26 may be suitably guided over the idlers 29, 30.

31 designates the fountain containing a supply of the coating material, which latter may be of any suitable character. In the fountain 31 is an interrupted feed roll consisting of the roll sections 32, 33, 34, preferably arranged on a common shaft 35, the roll bearing against a distributing roll 36 which is preferably hollow so as to be heated by steam and is preferably provided with a felt covering 37.

If it is desired to place a continuous body or strip of the coating upon the web, as well as the interrupted bodies to be hereinafter described, the machine may be provided with a constantly acting coating roller 38 (Figs. 1 and 6), the shaft of which, 39, has fixed bearings (not shown) so that this roller is always in contact with the distributing roll 36 and the web of paper on the roller 25.

In Fig. 6, *a* designates the body or strip of carbon which is placed on the web by means of the coating roller 38. In the same figure *b* designates one of a series of bodies of coating which are spaced apart on the web but contiguous to the continuous strip *a*. These bodies of coating are placed on the web by means of an intermittently acting coating roller 40 which, in the preferred arrangement shown, always remains in contact with the distributing roll 36 but which is intermittently moved into and out of contact with the web of fabric on the roller 25. Roller 40 is provided with journals 41 which are mounted in the supporting members 42, 43, pivotally connected by means of a shaft 44 to one arm of the rocking member 45 which is non-rotatably fixed to a rock shaft 46 and carries on its other extremity the roller 47 adapted to be engaged by the cam wheel 48 fixed on the rotatable shaft 49. The cam wheel 48 is formed with the deep grooves 50 between which are the shallower grooves 51 providing pairs of teeth 52. When roller 47 rests in one of the grooves 50 the coating roller 40 is in contact with the web on roller 25. When the roller 47 rides up and rests upon the teeth 52 the coating roller 40 is moved away from roller 25.

The mechanism for giving a step by step rotation to cam wheel 48 is preferably made up of the following instrumentalities: 53 designates a governing wheel formed with one or more dovetailed peripheral grooves 54 and with the transverse dovetailed groove 55, the portions 56 of the perimeter of the wheel adjacent the grooves being preferably serrated. The wheel 53 is arranged so that it turns in correspondence with the movement of the paper web 26. For example, it may be carried on the shaft 57 of the drum 28 on which the web or paper is wound after being carbonized. On the perimeter of the wheel 53 are the wedge blocks 58, the under surfaces of which are serrated as shown at 59 (Fig. 5), the blocks being secured to the wheel by the screws 60 which can be slipped first through the transverse groove 55 and then into one or other of the peripheral grooves 54. Pivoted in slots 61 formed in a fixed frame member 62 on a preferably removable pivot pin 63 are the levers 64 corresponding in number to grooves 54, the levers being formed with noses 65 adapted to be engaged by the wedge blocks 58. Pivoted to each of the levers 64 is a rod 66 guided in the fixed frame member 67 and having its extremity threaded for the stop nuts 68. The rod 66, in each case, carries a block 69 adjustably connected thereto by means of the set screw 70, the block being formed with a fork 71 in which is pivoted a pawl 72 engaged by a spring 73 and operating upon a ratchet 74 keyed to the shaft 49. The ratchets 74 are set on the shaft with their teeth mismatching, the purpose of multiplying the ratchets and their operating mechanisms being to give greater variability and positiveness to the apparatus for moving the coating roller 40 than would be feasible if a single such mechanism were employed.

The coating roller 40 is brought into contact with the web on roller 25, when the roller 47 rides into one of the deep grooves 50 of the cam wheel 48, preferably by means of a compound spring such as that shown in detail in Figs. 7 and 8. Two rings 75 are provided to which are attached, in circular arrangement, the opposite ends of a plurality of spiral springs 76 preferably made of wire of rather small gage. A spring of this character is provided with the bails 77 and secured by means of the wires 78, 79 to an anchorage 80 and to a finger 81 on the rock shaft 46. The reason for using a compound spring of this sort is to produce a very quick movement of the coating roller 40 in order to avoid smearing. A single heavy spring would not give the desired quick movement. If a single spring were made light enough to have the necessary quick response it would not be likely to be strong enough to do its work. A similar compound spring 82 is interposed between an anchorage 83 and the lower end of each of the levers 64. A similar spring 84 is placed around the end of a rod 85 which is pivoted to a bracket 86 on the support or arm 42, spring 84 being provided with a two-part bail 87 which attaches the spring to a lug 88 on a collar 89 secured by means of a set screw 90 to a fixed rod 91, the other end of the spring being provided with a two-part bail 92 attaching the spring to a nut 93 on the threaded end 94 of rod 85. Spring 84 is kept under tension and its function is to force the coating roller 40 down upon the distributing roll 36.

It is desirable to provide a driving mechanism for roller 40 which will accommodate itself to the shifting movements of the roller so that the disconnection of the driving mechanism from the roller will not be necessary when the roller is moved away from the web. A suitable driving mechanism of this character may be made up of the following parts: 95 is a bevel gear on one end of the roller 40 meshed by a bevel gear 96 on a shaft 97 which turns in a bearing formed on the bracket 86. The shaft 97 is kept from endwise movement by means of the collar 98. The other end of shaft 97 turns in a bearing provided by a yoke 99 loosely mounted on a driving shaft 100. The latter carries a bevel gear 101 which meshes with a bevel gear 102 formed with a key 103 entering an elongated key way 104 in the end of shaft 97. The bevel gear 102 is kept from lateral movement by its position between the ends of yoke 99. Shaft 97 is capable, however, of longitudinal movement with respect to the yoke 99 and bevel gear 102. I have not shown in the drawings any means for driving shaft 100, rollers 25 and 27, drum 28 and the feed and distributing rolls, but it will be obvious that movement may be imparted to these elements by any suitable form of gearing or other driving mechanism.

It may in some cases be desirable that the coating be smoothed down after it has been placed upon the web. In Figs. 1 and 6 I have shown a brush for accomplishing this operation, which brush is moved into and out of contact with the paper web in synchronism with the intermittent movements of coating roller 40. As shown, the brush is operated by the same mechanism which moves the coating roller. The brush, and by this term I intend any device suitable for smoothing or finishing the coating, is designated 105 and is pivoted at 105ᵃ to a block 106 carried in a fixed guide 107 being preferably adjustably mounted therein on the screw 108. A two-part link 109, the parts of which, for purposes of adjustment, are connected by turn buckle 110, connects the handle end of brush 105 with the shaft 44 so that the rocking movements of the rocking member 45 which move the coating roller 40 into and out of contact with the web of paper on roller 25 simultaneously tilt the brush 105 into and out of contact with said web.

If it be desired to place upon the web separate bodies of carbon of irregular shape, such as that designated c in Fig. 6, the operation can be best performed by means of a stencil. In the drawings such stencil is designated 111 and is shown as extending around one end of roller 25 and around a coating roller 112 on shaft 39 (Fig. 6) and the idlers 113. Coating roller 112 is in contact with the distributing roll 36.

The operation of the apparatus above described is as follows: The paper web 26 is unwound continuously from the roll 27 and passes over the idlers 29 and 30 around roller 25 and is then wound up on the drum 28. In the particular form of apparatus shown three carbonizing operations are performed. The coating roller 38 places a continuous body or strip a of carbon on the paper. The intermittent moving coating roller 40 carbonizes the web at places designated b which, in the particular arrangement shown, are contiguous to the continuous strip a. The movements of the roller 40 are dependent upon the position of the wedge blocks 58 on the perimeter of wheel 53. When one of the blocks 58 comes into contact with the nose 65 of the corresponding lever 64 the pawl 72 operated by the lever is moved back so as to engage the next tooth of its ratchet. Spring 82 by bringing lever 64 to its normal position turns the ratchet, and consequently the cam wheel 48, forward one revolution. If roller 47 has been resting in one of the deep grooves 50 this movement of the cam wheel 48 causes the roller 47 to ride up onto the teeth 52 which moves coating roller 40 out of contact with roller 25. At the next step in the rotation of cam wheel 48 the roller 47 is forced down into one of the grooves 50 by means of the compound spring 76 and this carries the roller 40 into contact with the paper web on roller 25. Coating roller 40 is continuously driven from driving shaft 100 by means of the transmission shaft 97 and the bevel gears connected therewith regardless of whether the roller is in or out of its operative position. The stencil 111 intervenes between the web and the coating roller 112 on the shaft 39 so that the coating is applied to this part of the web, the bodies of coating being designated c, only at places corresponding to the openings in the stencil.

The feed rolls 32, 33 and 34 are preferably given widths corresponding to the amount of the coating required for the three operations performed. Feed roll 32 is relatively broad and is placed opposite to the coating roller 38, the entire surface of the latter roller being always in contact with the paper. Since roller 40 has an intermittent operation the feed roll 33 is made smaller. The same is true with respect to the feed roller 34 for the stencil side of the apparatus. This method of feeding the coating is made possible by using a thick, preferably felt, covering 37 on the distributing roll 36.

While I have described certain preferred constructions, arrangements and devices going to make up a complete form of apparatus embodying all of the desirable features of my invention, it will be understood that there might be some modification therein without departure from the invention. For example, it will not be necessary to use all of the sets of instrumentalities shown and described in any given machine. The invention has been embodied in a machine which operates continuously upon a continuous web of paper or other fabric. While this is the preferred form of my invention it would be possible to embody the principles thereof in a machine constructed and operated in a somewhat different manner. Therefore I do not limit myself to the particulars shown and described except so far as the same are made specifically limitations on certain of the claims herein.

While the apparatus has been described, and is particularly suitable, for use in making carbon paper, it will be obvious that it might be employed for performing other coating operations where similar conditions prevail.

I claim:

1. In apparatus of the character described, the combination with a roller over which the fabric operated upon is run, of a continuously rotating coating roller adapted to come into contact with the fabric, and means for intermittently holding said coating roller out of contact with said fabric.

2. In apparatus of the character described, the combination with a roller over which the fabric operated upon is run, of a continuously rotating coating roller, and means for shifting said last named roller into and out of contact with the fabric.

3. In apparatus of the character described, the combination with a roller over which the fabric operated upon is run, of a continuously rotating coating roller, means for shifting said last named roller into and out of contact with the fabric, a fountain for the coating material, a feed roll which revolves in said fountain, and a distributing roll interposed between the feed roll and the coating roller.

4. In apparatus of the character described, the combination with a roller over which the fabric operated upon is run, of a continuously rotating coating roller, means for shifting said last named roller into and out of contact with the fabric, a fountain for the coating material, a feed roll which revolves in said fountain, and a distributing roll interposed between the feed roll and the coating roller with which said coating roller remains in contact at all times.

5. In apparatus of the character described, the combination with means providing a supporting surface for the fabric operated upon, of an element which carries the coating material, means for continuously rotating said element, means for shifting said element out of contact with said fabric, and a spring mechanism for moving the same into contact therewith.

6. In apparatus of the character described, the combination with means providing a supporting surface for the fabric operated upon, of an element which carries the coating material, means for continuously rotating said element, and mechanism for shifting said element into and out of contact with said fabric comprising a rocking member, a cam wheel which engages with the rocking member, and a spring which carries said coating roller into its operative position.

7. In apparatus of the character described, the combination with a roller over which the fabric to be operated upon is run, a coating roller and mechanism for moving the coating roller into and out of contact with the fabric comprising a rocking member, springs against the tension of which the rocking member is moved, a cam wheel engaging with the rocking member, and means for giving said cam wheel a step by step rotation.

8. In apparatus of the character described, the combination with a roller over which the fabric to be operated upon is run, a coating roller and mechanism for moving the coating roller into and out of contact with the fabric comprising a rocking member, springs against the tension of which the rocking member is moved, a notched cam wheel engaging with the rocking member, alternate notches being of different effective depths, and means for giving said cam wheel a step by step rotation.

9. In apparatus of the character described, the combination with a roller over which the fabric to be operated upon is run, a coating roller and mechanism for moving the coating roller into and out of contact with the fabric comprising a rocking member, a cam wheel engaging with the rocking member, and a ratchet and pawl mechanism to give a step by step rotation to the cam wheel.

10. In apparatus of the character described, the combination with a roller over which the fabric to be operated upon is run, a coating roller and mechanism for moving the coating roller into and out of contact with the fabric comprising a rocking member, a cam wheel engaging with the rocking member, a ratchet rigid with said cam wheel, a pawl to operate said ratchet, a lever by means of which said pawl is moved, and a wheel provided with peripheral projections adapted to engage with and move said lever.

11. In apparatus of the character described, the combination with a roller over which the fabric to be operated upon is run, a coating roller and mechanism for moving the coating roller into and out of contact with the fabric comprising a rocking member, a cam wheel engaging with the rocking member, a ratchet rigid with said cam wheel, a pawl to operate said ratchet, a lever by means of which said pawl is moved, and a wheel provided with peripheral projections adapted to engage with and move said lever, said last mentioned wheel having a serrated perimeter and the blocks being serrated on their under surfaces and adapted to be adjustably fixed to said wheel.

12. In apparatus of the character described, the combination with a roller over which the fabric to be operated upon is run, a continuously rotating coating roller and mechanism for moving the coating roller into and out of contact with the fabric comprising a lever, a wheel, and wedge blocks adjustably secured to the perimeter of the wheel and adapted to engage with and tilt said lever.

13. In apparatus of the character described, the combination with a roller over which the fabric operated upon is run, a cylindrical coating roller, means for shifting said last named roller into and out of contact with the fabric, and means for continuously rotating the coating roller.

14. In apparatus of the character described, the combination with a roller over which the fabric to be operated upon is run, a coating roller pivoted supports on which said coating roller is mounted, means for shifting said supports, and a driving mechanism for said coating roller comprising a driving shaft, a bevel gear on said driving shaft, a bevel gear on the roller, and a transmission shaft carrying a bevel gear at each end, said transmission shaft being slidable with respect to one of the bevel gears carried thereon.

15. In apparatus of the character described, the combination with a roller over which the fabric to be operated upon is run, a coating roller, a fountain for the coating material, a feed roll, a distributing roll interposed between the feed roll and the coating roller, pivoted supports for said coating roller, a rocking member connected with said supports, a notched cam wheel, alternate notches of which have different effective depths, a ratchet and pawl mechanism for giving a step by step movement to the cam wheel, mechanism for governing the operation of the ratchet and pawl mechanism comprising a wheel provided with peripheral wedge shaped projections, and a lever with which said projections are adapted to engage, a spring to force said coating roller into contact with said fabric, and a driving mechanism for rotating said coating roller.

16. In apparatus of the character described, the combination with means providing a supporting surface for the fabric operated upon, of a continuously operating element which carries the coating material, means for shifting said element into and out of contact with the fabric, a brush, and means for moving said brush into and out of contact with said fabric, for the purpose described.

17. In apparatus of the character described, the combination with means providing a supporting surface for the fabric operated upon, of a coating roller which is continuously in contact with said fabric, a second coating roller, means for intermittently holding said second roller out of contact with the fabric, a fountain for the coating material, a distributing roll with which both coating rollers are in contact, and an interrupted feed roller formed in sections, the superficial areas of which correspond to the proportional amounts of the coating material which are used by said coating rollers.

18. In apparatus of the character described, the combination with means providing a supporting surface for the fabric operated upon, of a continuously operating element which carries the coating material and which is adapted to come into contact with the fabric, means for moving said element into and out of contact with the fabric, and a governing element adapted to control the movements of said last mentioned means.

19. In apparatus of the character described, the combination with means providing a supporting surface for the fabric operated upon, of a continuously operating element which carries the coating material and which is adapted to come into contact with the fabric, means for moving said element into and out of contact with the fabric, and a governing element which moves synchronously with the paper adapted to control the movements of said last mentioned means.

20. In apparatus of the character described, the combination with means providing a supporting surface for the fabric operated upon, of a continuously operated element which carries the coating material and which is adapted to come into contact with the fabric, means for moving said element into and out of contact with the fabric, and a governing element comprising adjustable members which can be set at different positions for controlling the movements of said last mentioned means in a predetermined manner.

21. In apparatus of the character described, the combination with supporting means for the fabric operated upon, of a continuously operated coating element adapted to contact with said fabric, and mechanism for intermittently separating the fabric and said coating element, which mechanism is adjustable so as to vary the places at which the interruptions of the coating occur.

22. In apparatus of the character described, the combination with a supporting roll over which the fabric operated upon is run, of a continuously operated coating roller adapted to contact with the fabric, and mechanism for intermittently moving the coating roller out of contact with the fabric, which mechanism is adjustable so as to vary the places at which the interruptions of the coating occur.

ARTHUR T. EMERY.

Witnesses:
P. W. TRUMAN,
L. A. FALKENBERG.